US012224530B2

(12) United States Patent
Zeng

(10) Patent No.: US 12,224,530 B2
(45) Date of Patent: Feb. 11, 2025

(54) CONNECTOR ASSEMBLY OF SUPPORTING FORWARD AND REVERSE INSERTION FUNCTION, AND FEMALE CONNECTOR

(71) Applicant: ASUSTeK COMPUTER INC., Taipei (TW)

(72) Inventor: Guang-Yi Zeng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 317 days.

(21) Appl. No.: 17/706,672

(22) Filed: Mar. 29, 2022

(65) Prior Publication Data

US 2022/0320802 A1 Oct. 6, 2022

(30) Foreign Application Priority Data

Apr. 1, 2021 (TW) ................................ 110112234

(51) Int. Cl.
*H01R 13/6474* (2011.01)
*H01R 24/60* (2011.01)

(52) U.S. Cl.
CPC ......... *H01R 13/6474* (2013.01); *H01R 24/60* (2013.01)

(58) Field of Classification Search
CPC ............................ H01R 13/6474; H01R 24/60
See application file for complete search history.

(56) References Cited

U.S. PATENT DOCUMENTS 6,494,734 B1 * 12/2002 Shuey ................ H01R 13/6471 439/378
6,942,511 B1 * 9/2005 Orsley ................... H01R 12/79 439/948
7,137,839 B2 * 11/2006 Dilliner .................. H01R 24/28 439/489
7,448,917 B2 11/2008 Liao et al.
7,713,093 B2 5/2010 Kim
9,887,492 B2 2/2018 Umehara
10,714,856 B2 7/2020 Huang
2007/0167038 A1 * 7/2007 Goodman .............. H01R 24/84 439/70
2017/0018872 A1 * 1/2017 Rollmann ........ H01R 13/62977
2017/0244198 A1 * 8/2017 Wanner .............. H01R 13/6691
2020/0076106 A1 3/2020 Miled
2020/0214151 A1 7/2020 Su et al.

FOREIGN PATENT DOCUMENTS

| | | | |
|---|---|---|---|
| CN | 100539314 | C | 9/2009 |
| CN | 101321345 | B | 11/2012 |
| CN | 106104940 | A | 11/2016 |
| CN | 108370112 | A | 8/2018 |
| CN | 109193216 | B | 6/2020 |
| EP | 1860739 | B1 | 11/2007 |
| TW | 572431 | U | 1/2004 |
| TW | 200737612 | A | 10/2007 |

* cited by examiner

*Primary Examiner* — Oscar C Jimenez
(74) *Attorney, Agent, or Firm* — McClure, Qualey & Rodack, LLP

(57) ABSTRACT

A connector assembly includes a male connector and a female connector. The male connector includes N pins with different lengths, and the N pins respectively correspond to N different transmission signals. The female connector includes N signal layers configured to transmit the N different transmission respectively, and each of the N signal layers includes N pass gates. One of the N pass gates of each of the N signal layers is configured to be coupled to a corresponding one of the N pins.

10 Claims, 7 Drawing Sheets

CONNECTOR ASSEMBLY OF SUPPORTING FORWARD AND REVERSE INSERTION FUNCTION, AND FEMALE CONNECTOR

CROSS-REFERENCE TO RELATED APPLICATION

This application claims the priority benefit of Taiwan application serial No. 110112234, filed on Apr. 1, 2021. The entirety of the above-mentioned patent application is hereby incorporated by reference herein and made a part of the specification.

BACKGROUND OF THE INVENTION

Field of the Invention

The disclosure relates to a connector assembly.

Description of the Related Art

In the current mainstream connector with a universal serial bus (USB for short), only the Type-C type connector is allowed to be inserted forward or backward, regardless of the front and back sides.

However, signal pins are divided into two rows: an upper row and a lower row in the current Type-C connector. The signal pins on the upper row are configured to transmit signals during the forward insertion, and the signal pins on the lower row is configured to transmit the signals during the reverse insertion. That is, compared to other types of connectors, signal pins are required to be doubled for the Type-C connector.

BRIEF SUMMARY OF THE INVENTION

According to the first aspect, a connector assembly is provide. The connector assembly includes a male connector and a female connector. The male connector includes N pins with different lengths, and the N pins respectively correspond to N different transmission signals. The female connector includes N signal layers configured to receive the N different transmission respectively, and each of the N signal layers includes N pass gates. One of the N pass gates of each of the N signal layers is configured to be coupled to a corresponding one of the N pins.

According to the second aspect, a female connector configured to be coupled to a male connector is provided. The male connector has N pins with different lengths, the N pins respectively correspond to N different output signals, and the female connector includes N signal layers. The N signal layers are configured to receive the N output signals respectively, and each of the N signal layers has N pass gates. One of the N pass gates of each of the N signal layers is configured to be coupled to a corresponding one of the N pins.

According to the second aspect, a male connector configured to form a connector assembly with a female connector is provided. The male connector has N pins with different lengths, and the N pins respectively correspond to N different transmission signals transmitted by N signal layers of the female connector. Each of the N signal layers includes N pass gates, and the N pins are configured to be coupled to different ones of the N signal layers.

According to the connector assembly of the disclosure, quantities of the connector pins and the output signals are reduced.

DETAILED DESCRIPTION OF THE EMBODIMENTS

Figure 1:
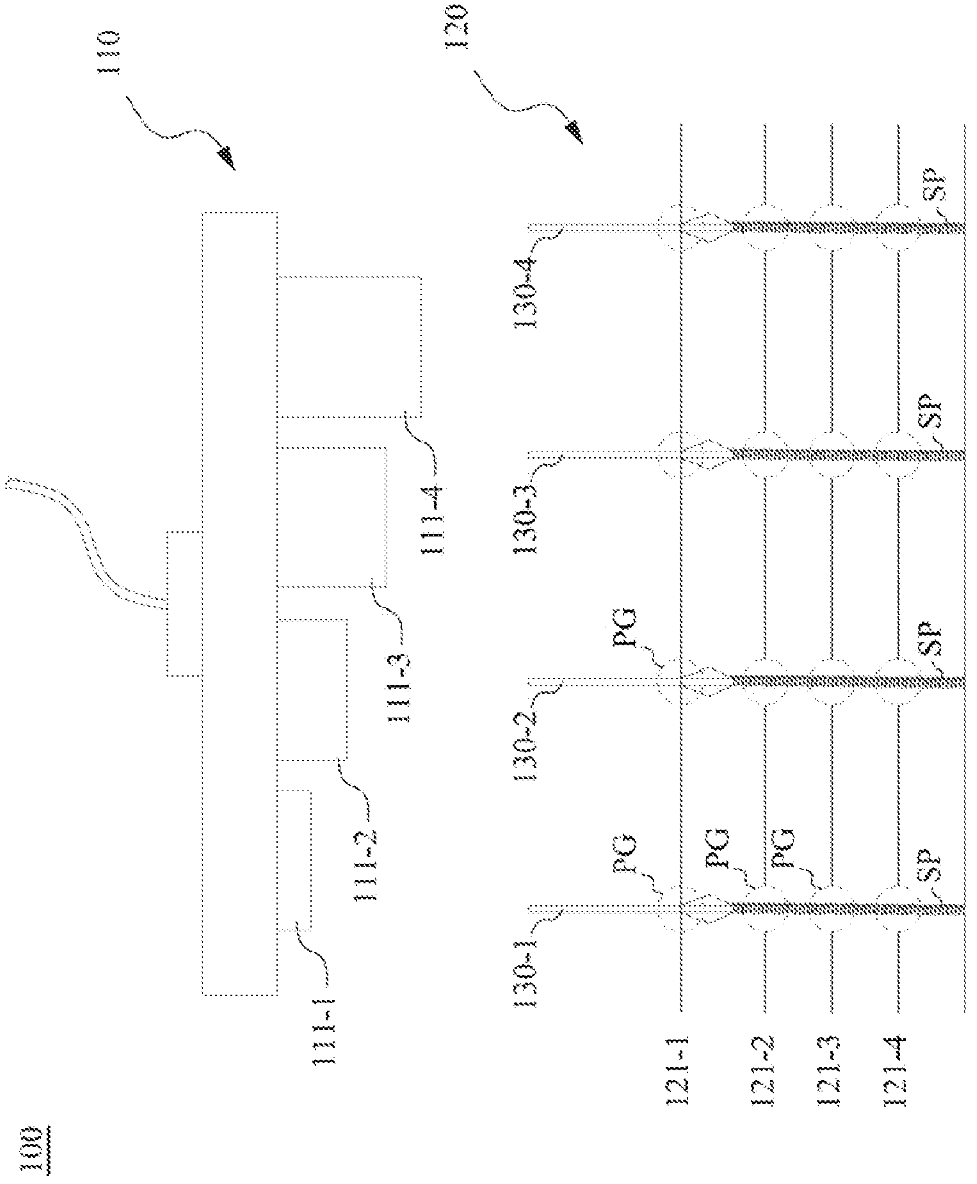
FIG. 1 is a schematic diagram of a connector assembly according to some embodiments of the disclosure.

As shown in FIG. 1, the connector assembly 100 includes a male connector 110 and a female connector 120. The male connector 110 includes a plurality of pins 111-1 to 111-4 with different lengths. In one embodiment, the pin 111-1 has the shortest length, a length of the pin 111-2 is longer than the length of the pin 111-1, a length of the pin 111-3 is longer than the length of the pin 111-2, and a length of the pin 111-4 is longer than the length of the pin 111-3, which is not limited thereto. The female connector 120 includes a plurality of signal layers 121-1 to 121-4 and a plurality of top pins 130-1 to 130-4. The top pins 130-1 to 130-4 movably pass through at least one of the signal layers 121-1 to 121-4. In one embodiment, each of the top pins 130-1 to 130-4 includes a conducting element BP and a reset element SP. The conducting element BP is made of a conducting material, and the reset element SP is an elastic element (for example, a spring).

In the embodiment of FIG. 1, the signal layer 121-1 is located above the signal layer 121-2, the signal layer 121-2 is located above the signal layer 121-3, and so on. In addition, each of the signal layers 121-1 to 121-4 includes a plurality of pass gates PG, and a amount of the pass gates PG of each of the signal layers 121-1 to 121-4 corresponds to a amount of the pins 111-1 to 111-4.

When the male connector 110 is engaged with the female connector 120, the pins 111-1 to 111-4 of the male connector 110 are respectively in contact with the top pins 130-1 to 130-4, so as to respectively push the conducting elements BP of the top pins 130-1 to 130-4 to different signal layers 121-1 to 121-4 for coupling. In detail, when the male connector 110 is engaged with the female connector 120, the pins 111-1 to 111-4 of the male connector 110 respectively push the conducting elements BP of the top pins 130-1 to 130-4 to contact with the pass gates PG on the different signal layers 121-1 to 121-4, so that the pins 111-1 to 111-4 are respectively coupled to the different signal layers 121-1 to 121-4 by the conducting elements BP and the pass gates PG. At this time, the reset elements SP of the top pins 130-1 to 130-4 also correspondingly have different length variances according to the lengths of the pins 111-1 to 111-4. In an embodiment, when the pin 111-4 with the longest length pushes the conducting element BP of the top pin 130-4 to the signal layer 121-4, the reset element SP of the top pin 130-4 is compressed and has the maximum length variance. In one embodiment, when the male connector 110 is not engaged with the female connector 120, the conducting elements BP of the top pins 130-1 to 130-4 are all coupled to the signal layer 121.

In some embodiments, when the pins 111-1 to 111-4 of the male connector 110 are respectively coupled to the corresponding signal layers 121-1 to 121-4, a plurality of different signal transmission paths is formed. In an embodiment, the pin 111-1 and the signal layer 121-1 form a ground signal transmission path G, the pin 111-2 and the signal layer 121-2 form a power signal transmission path V, the pin 111-3 is coupled to the signal layer 121-3 to form a first differential signal transmission path D+, and the pin 111-4 is coupled to the signal layer 121-4 to form a second differential signal transmission path D−. The specific operation of the connector assembly 100 is to be described in more detail with reference to FIG. 3A to FIG. 3B described later.

It should be noted that the quantities of the pins 111-1 to 111-4, the signal layers 121-1 to 121-4, and the top pins 130-1 to 130-4 in FIG. 1 are merely exemplary embodiments, and are not intended to limit actual embodiments of the disclosure. For the convenience of description, the pin 111, the signal layer 121, and the top pins 130 are respectively referred to as ones of the pins 111-1 to 111-4, the signal layers 121-1 to 121-4, and the top pins 130-1 to 130-4 below.

Figure 2:
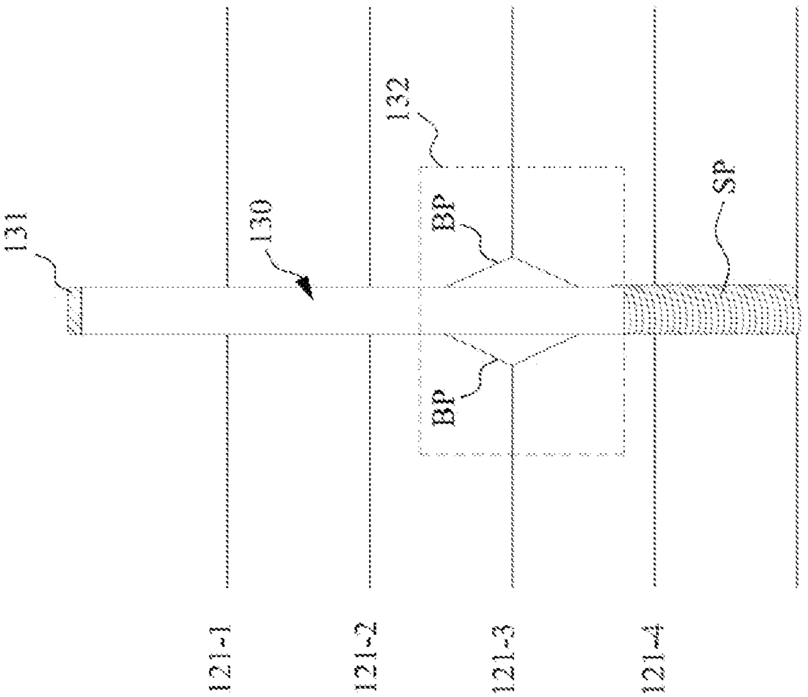
FIG. 2 is a schematic diagram of an top pin according to some embodiments of the disclosure.

As shown in FIG. 2, each of the top pins 130 further includes a top end 131 and a connecting portion 132, and the connecting portion 132 is connected to the top end 131 and the conducting element BP. The top end 131 of the top pin 130 is made of a conductive material (for example, a metal material) for being electrically coupled to the pin 111 of the male connector 110. The top pin 130 is also made of the conductive material and has a protruding structure. When the conducting element BP is in contact with the pass gate PG, the pin 111 is coupled to the signal layers 121 to form a signal transmission path. In one embodiment, a surface of the remaining part (for example, outside the conducting element BP and the top end 131) of the top pin 130 is covered with a non-conductive insulating material, so as to prevent the top pins 130 from being electrically connected to a plurality of signal layers 121 simultaneously to form a short circuit when a user inserts the male connector 110 into the female connector 120.

In some embodiments, an aperture of the pass gate PG on the signal layer 121-1 is less than an aperture of the pass gate PG on the remaining signal layers 121-2 to 121-4, and the conducting element BP of the top pin 130 is greater than the aperture of the pass gate PG on the signal layer 121-1. In this way, when the user the male connector 110 is pulled out of the female connector 120, the reset elements SP of the top pins 130 provide corresponding elastic forces to reset the connecting portion 132 according to the respective length variances, and the conducting element (BP) of the connecting portion 132 is stuck by the pass gate PG on the signal layer 121-1, thereby preventing the top pins 130 from falling off.

Figure 3B:
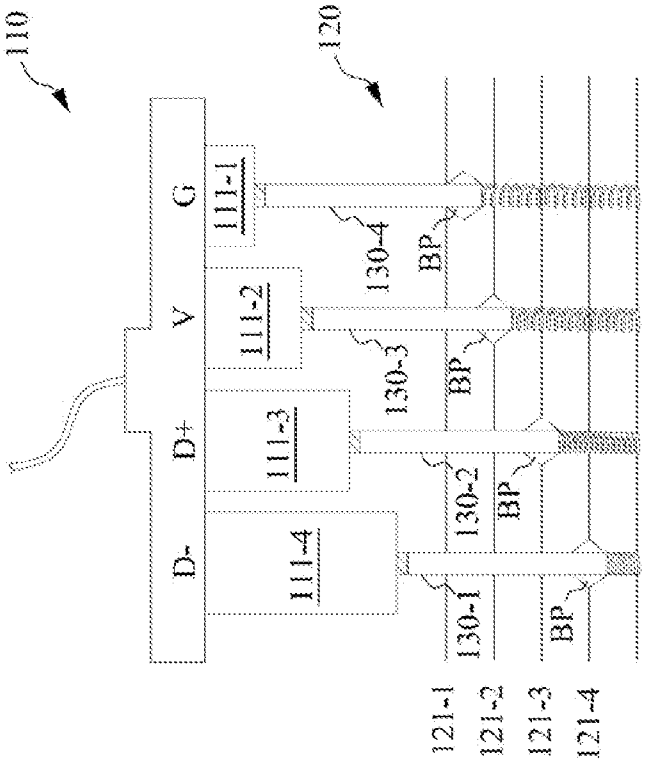
FIG. 3A to FIG. 3B are each a schematic diagram showing operation of a connector assembly according to some embodiments of the disclosure.
Figure 3A:
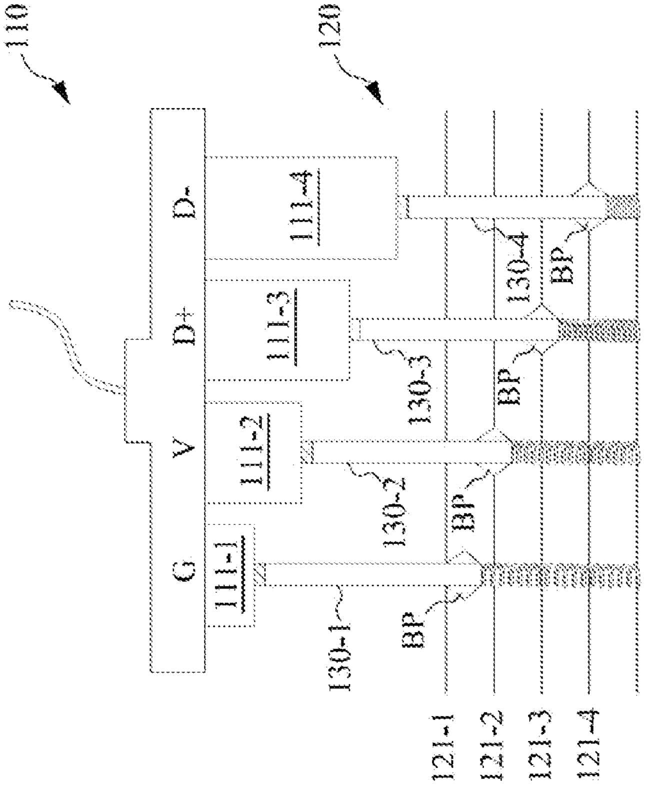

The connector assembly 100 has two engagement modes respectively shown in FIG. 3A and FIG. 3B. In an embodiment, as shown in FIG. 3A, when the male connector 110 is engaged with the female connector 120 by forward insertion, the pin 111-1 comes into contact with the top pin 130-1, the pin 111-2 comes into contact with the top pin 130-2, the pin 111-3 comes into contact with the top pin 130-3, and the pin 111-4 comes into contact with the top pin 130-4. Specifically, when the male connector 110 is engaged with the female connector 120 by forward insertion, the pin 111-1 is coupled to the signal layer 121-1 to form the ground signal transmission path G by the conducting element BP of the top pin 130-1. The pins 111-2 to 111-4 push the conducting elements BP of the top pins 130-2 to 130-4 from the signal layer 121-1 to the signal layers 121-2 to 121-4 respectively, so as to be electrically connected to the signal layers 121-2 to 121-4 respectively. In this way, the pin 111-2 is coupled to the signal layer 121-2 to form the power signal transmission path V by the conducting element BP of the top pin 130-2, the pin 111-3 is coupled to the signal layer 121-3 to form the first differential signal transmission path D+ by the conducting element BP of the top pin 130-3, and the pin 111-4 is coupled to the signal layer 121-4 to form the second differential signal transmission path D− by the conducting element BP of the top pin 130-4.

In one embodiment, when the male connector 110 is engaged with the female connector 120 by reverse insertion, as shown in FIG. 3B, the pin 111-1 contacts the top pin 130-4, the pin 111-2 contacts the top pin 130-3, the pin 111-3 contacts with the top pin 130-2, and the pin 111-4 contacts with the top pin 130-1. Specifically, when the male connector 110 is engaged with the female connector 120 in a second connection mode, the pin 111-1 is coupled to the signal layer 121-1 to form the ground signal transmission path G by the conducting element BP of the top pin 130-4, and the pins 111-2 to 111-4 respectively push the top pins 130-3, 130-2, and 130-1 from the signal layer 121-1 to the signal layers 121-2 to 121-4, so as to be electrically connected to the signal layers 121-2 to 121-4 respectively. In this way, the pin 111-2 is coupled to the signal layer 121-2 to form the power signal transmission path V by the conducting element BP of the top pin 130-3, the pin 111-3 is coupled to the signal layer 121-3 to form the first differential signal transmission path D+ by the conducting element BP of the top pin 130-2, and the pin 111-4 is coupled to the signal layer 121-4 to form the second differential signal transmission path D− by the conducting element BP of the top pin 130-1.

That is to say, no matter in the operation mode of FIG. 3A or FIG. 3B, the pins 111-1 to 111-4 of the male connector 110 perform signal transmission with the corresponding signal layers 121-1 to 121-4. Therefore, the connector assembly 100 achieves the effects of supporting the forward and reverse insertion function. Furthermore, compared with the conventional Type-C connector, the connector assembly 100 uses fewer signal pins to achieve the above effects.

Figure 4:
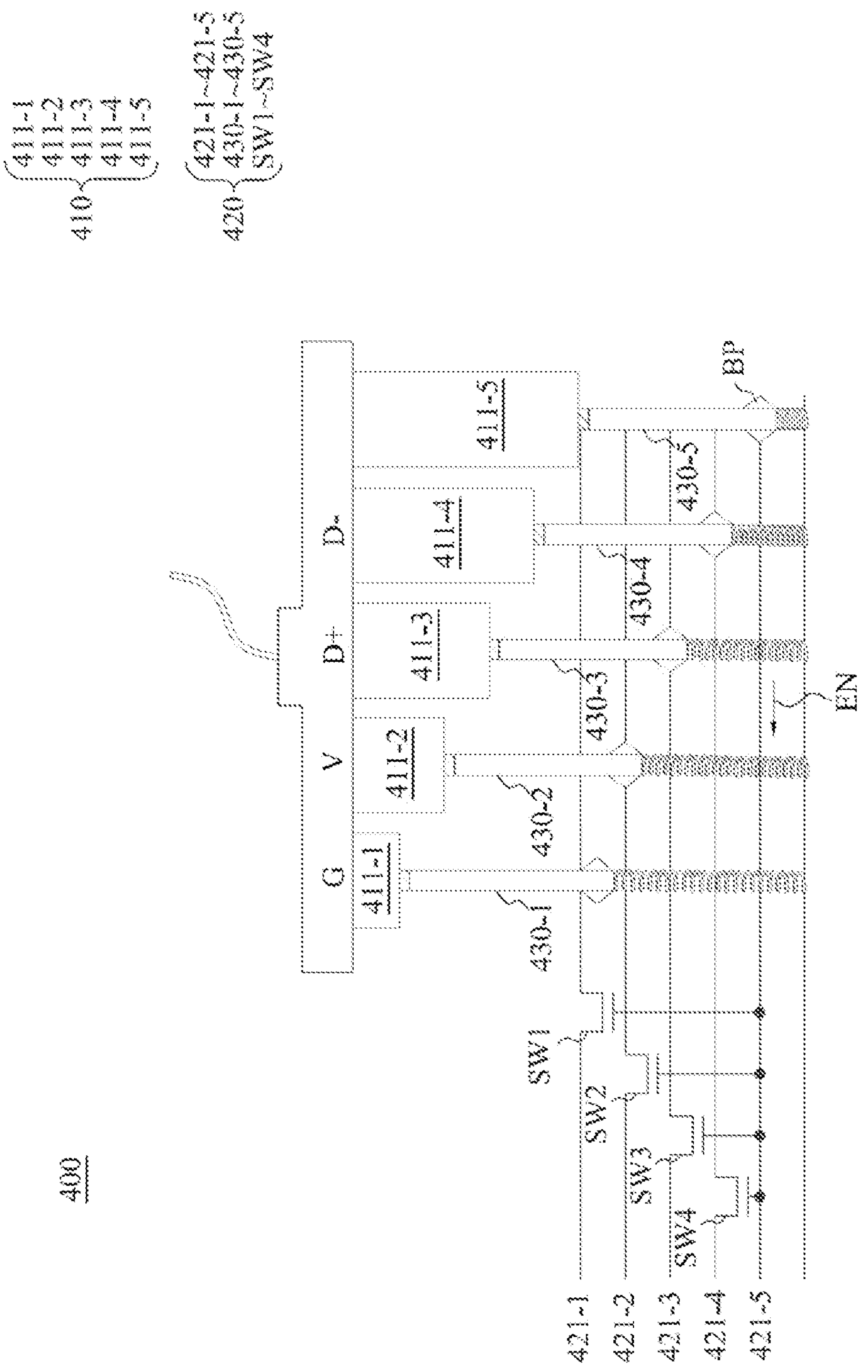
FIG. 4 is a schematic diagram of a connector assembly according to some other embodiments of the disclosure.

Referring to FIG. 4, the connector assembly 400 includes a male connector 410 and a female connector 420. The male connector 410 includes a plurality of pins 411-1 to 411-5 with different lengths. The pin 411-1 has the shortest length. A length of the pin 411-2 is longer than the length of the pin 411-1, a length of the pin 411-3 is longer than the length of the pin 411-2, a length of the pin 411-4 is longer than the length of the pin 411-3, and a length of the pin 411-5 is longer than the length of the pin 411-4, which is not limited thereto. The female connector 420 includes a plurality of signal layers 421-1 to 421-5, a plurality of top pins 430-1 to 430-5, and a plurality of switches SW1-SW4. Each of the signal layers 421-1 to 421-5 also includes a plurality of pass gates PG, and an amount of the pass gates PG of each of the signal layers 421-1 to 421-5 corresponds to an amount of the pins 411-1 to 411-5. Structurally, the switches SW1, SW2, SW3, and SW4 are respectively coupled between the signal layers 421-1, 421-2, 421-3, 421-4 and the signal layer 421-5, and control terminals (that is, gate terminals) of the switches SW1, SW2, SW3, and SW4 are coupled to the signal layer 421-5. The structures of the top pins 430-1 to 430-5 are similar to the structure of the aforementioned top pin 130, and the details are not described herein again.

The difference between the connector assembly 400 and the connector assembly 100 in FIG. 1 is that when the male connector 410 is engaged with the female connector 420 by means of forward insertion, the pin 411-5 with the longest length in the male connector 410 pushes the conducting element BP of the top pin 430-5 to the signal layer 421-5, and transmits an enable signal EN through the signal layer 421-5 to enable the switches SW1-SW4 in the signal layers 421-1 to 421-4. When the switches SW1-SW4 are enabled, the transmission paths between the signal layers 421-1 to 421-4 and the pins 411-1 to 411-4 of the male connector 410 are connected. In this way, the ground signal transmission path G is formed by the pin 411-1, the conducting element BP of the top pin 430-1 and the signal layer 421-1. The power signal transmission path V is formed by the pin 411-2, the conducting element BP of the top pin 430-2 and the signal layer 421-2. The first differential signal transmission path D+ is formed by the pin 411-3, the conducting element BP of the top pin 430-3 and the signal layer 421-3. The second differential signal transmission path D− is formed by the pin 411-4, the conducting element BP of the top pin 130-4 and the signal layer 421-4.

In one embodiment, when the male connector 410 is engaged with the female connector 420 by reverse insertion, the pin 411-5 pushes the conducting element BP of the top pin 430-1 to the signal layer 421-5 to transmit the enable signal EN to enable the switches SW1-SW4 in the signal layers 421-1 to 421-4. Similar to the aforementioned forward insertion mode, when the switches SW1-SW4 are enabled, the transmission paths between the signal layers 421-1 to 421-4 and the pins 411-1 to 411-4 of the male connector 410 are accordingly connected, and the details are not described herein again. In other words, the connector assembly 400 starts to operate only when the male connector 410 and the female connector 420 are fully engaged (that is, when the pin 411-5 with the longest length is coupled to the signal layer 421-5).

In this way, the connector assembly 400 prevents a short circuit from being caused by connection between one of the pins 411-1 to 411-4 and a non-corresponding one of the signal layers 421-1 to 421-4 due to incomplete engagement when the user inserts the male connector 410 into the female connector 420.

Figure 5:
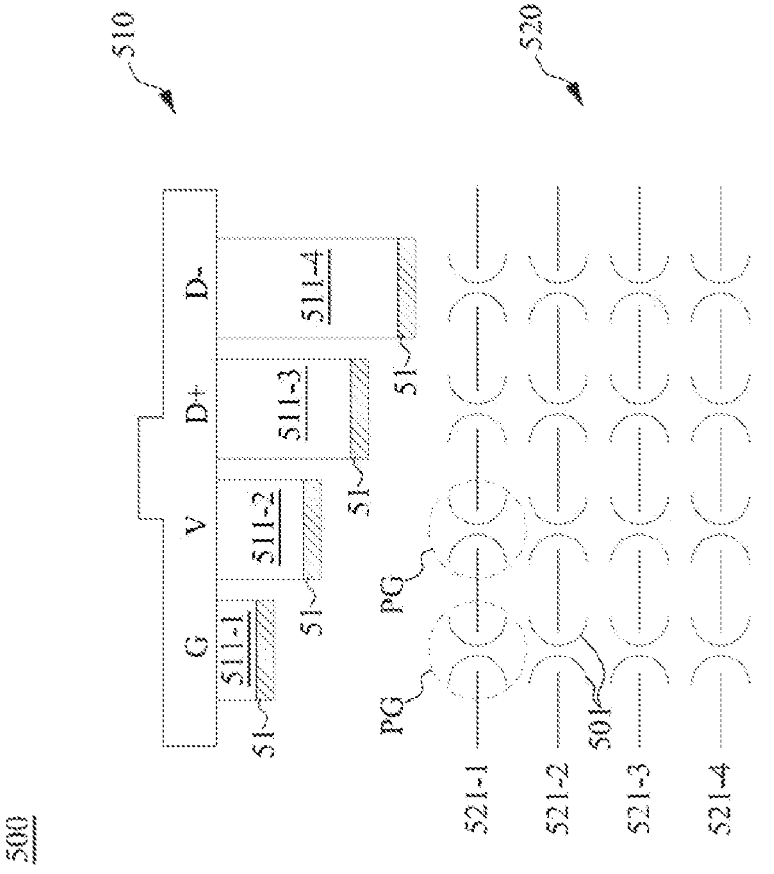
FIG. 5 is a schematic diagram of a connector assembly according to still another embodiment of the disclosure.

Referring to FIG. 5, the connector assembly 500 includes a male connector 510 and a female connector 520. The male connector 510 includes a plurality of pins 511-1 to 511-4 with different lengths, and the length relationship among the pins 511-1 to 511-4 is similar to that of the pins 111-1 to 111-4 in FIG. 1, and the details are not described herein again. The female connector 520 includes a plurality of signal layers 521-1 to 521-4. Each of the signal layers 521-1 to 521-4 includes a plurality of pass gates PG, and an amount of the pass gates PG of each of the signal layers 521-1 to 521-4 also corresponds to an amount of the pins 511-1 to 511-4. In the embodiment of FIG. 5, the signal layer 521-1 is located above the signal layer 521-2, the signal layer 521-2 is located above the signal layer 521-3, and the signal layer 521-3 is located above the signal layer 521-4. For the convenience of description, the pins 511 and the signal layers 521 are respectively referred to as unspecified ones of the pins 511-1 to 511-4 and the signal layers 521-1 to 521-4 below.

In some embodiments, first ends 51 of the pins 511 of the male connector 510 are made of the conductive material (for example, the metal material), and are configured to be electrically connected to the corresponding signal layers 521. The surface of the rest of the pins 511 is covered with a non-conductive insulating material, so as to avoid a short circuit formed by connection between one of the pins 511 and a non-corresponding one of the signal layers 121 to form when the male connector 510 is engaged with the female connector 520.

In addition, each pass gate PG on the signal layers 521 includes a plurality of elastic pieces 501. The elastic pieces 501 are made of a conductive material and used for fixing the pins 511 passing through the pass gate PG, and are electrically connected to the first ends 51 of the pins 511 to form signal transmission paths.

The difference between the connector assembly 500 and the connector assembly 100 in FIG. 1 is that in the embodiment in FIG. 5, the pins 511-1 to 511-4 of the male connector 510 directly come into contact with the signal layers 521-1 to 521-4 of the female connector 520. That is to say, when the connector 510 is engaged with the connector 520, the pins 511-1 to 511-4 of the connector 510 are respectively coupled to the signal layers 521-1 to 521-4 through different quantities of pass gates PG.

Figure 6A:
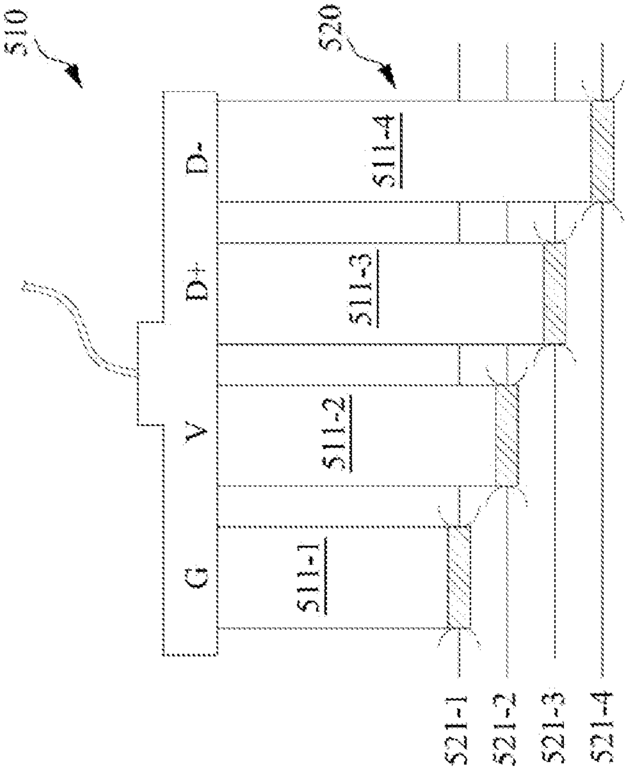
FIG. 6A to FIG. 6B are each a schematic diagram showing operation of the connector assembly according to the embodiment of FIG. 5 in the disclosure.

As shown in FIG. 6A, when the connector 510 is engaged with the connector 520 by forward insertion, the pin 511-1 passes through one pass gate PG, so that the first end 51 of the pin 511-1 is electrically connected to the signal layer 521-1 to form the ground signal transmission path G. The pin 511-2 passes through two pass gates PG, so that the first end 51 of the pin 511-2 is electrically connected to the signal layer 521-2 to form the power signal transmission path V. The pins 511-3 and 511-4 pass through three and four pass gates PG respectively, so that the first ends 51 of the pins 511-3 and 511-4 are respectively electrically connected to the signal layers 521-3 and 521-4 to form the differential signal transmission paths D+ and D− respectively.

Figure 6B:
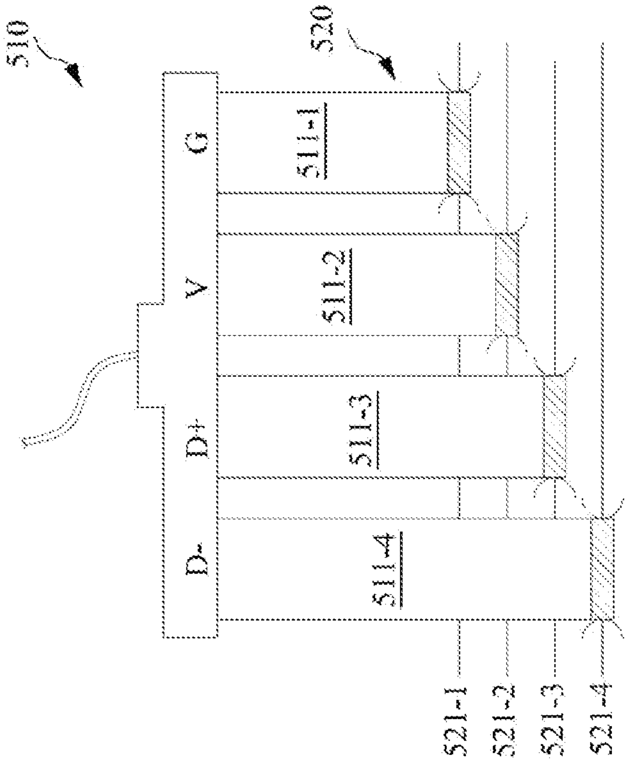

In one embodiment, as shown in FIG. 6B, when the male connector 510 is engaged with the female connector 520 by reverse insertion, since the lengths of the pins 511-1 to 511-4 do not change depending on whether the male connector 510 is inserted forward or backward, the pin 511-1 is still electrically connected to the signal layer 521-1 by using one pass gate PG, and the pin 511-2 is still electrically connected to the signal layer 521-2 by using two pass gates PG, and so on.

That is to say, no matter in the operation mode of FIG. 6A or FIG. 6B, the pins 511-1 to 511-4 of the male connector 510 also perform signal transmission with the corresponding signal layers 521-1 to 521-4. Therefore, the connector assembly 500 accordingly achieves the effects of supporting the forward and reverse insertion.

Figure 7:
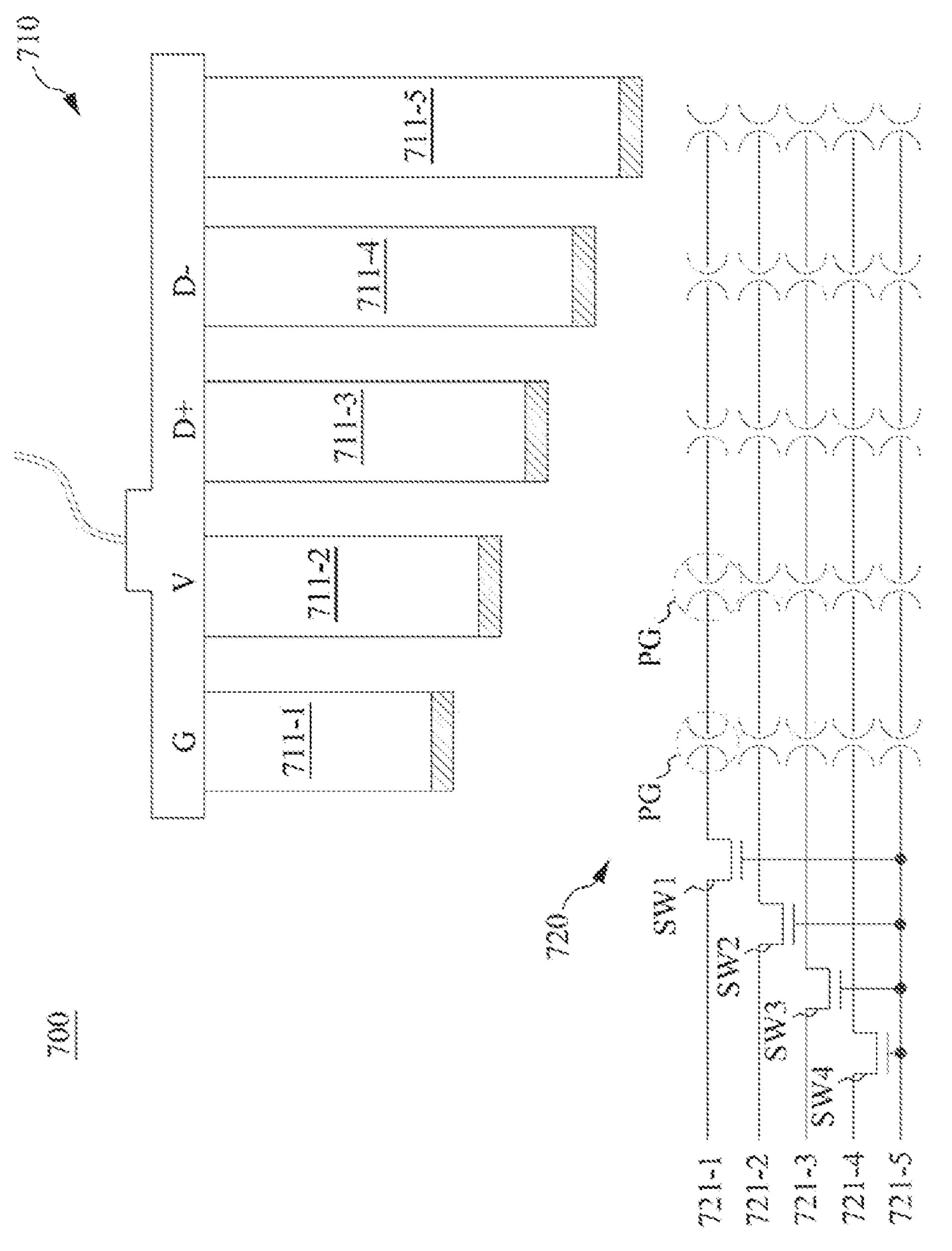
FIG. 7 is a schematic diagram of pins according to the embodiment of FIG. 5 in the disclosure.

Referring to FIG. 7, the connector assembly 700 includes a male connector 710 and a female connector 720. The male connector 710 includes a plurality of pins 711-1 to 711-5 with different lengths. A length relationship among the pins 711-1 to 711-5 is similar to that of the pins 411-1 to 411-5 in FIG. 4, and the details are not described herein again. The female connector 720 includes a plurality of signal layers 721-1 to 721-5 and a plurality of switches SW1-SW4. Each of the signal layers 721-1 to 721-5 also includes a plurality of pass gates PG, and an amount of the pass gates PG of each of the signal layers 721-1 to 721-5 corresponds to an amount of the pins 711-1 to 711-5. Structurally, the switches SW1, SW2, SW3, and SW4 are respectively coupled between the signal layers 721-1, 721-2, 721-3, 721-4 and the signal layer 721-5, and control terminals (that is, gate terminals) of the switches SW1, SW2, SW3, and SW4 are coupled to the signal layer 721-5.

The difference between the connector assembly 700 and the connector assembly 500 in FIG. 5 is that the pin 711-5 with the longest length in the male connector 710 is used for transmitting the enable signal EN through the signal layer 721-5, so as to enable the switches SW1-SW4 in the signal layers 721-1 to 721-4. When the switches SW1-SW4 are enabled, transmission paths between the signal layers 721-1 to 721-4 and the pins 711-1 to 711-4 of the male connector 710 are connected. In other words, the connector assembly 700 starts to operate only when the male connector 710 and the female connector 720 are fully engaged (that is, when the pin 711-5 with the longest length is coupled to the signal layer 721-5).

In this way, the connector assembly 700 prevents a short circuit from being caused by connection between one of the pins 711-1 to 711-4 and a non-corresponding one of the signal layers 721-1 to 721-4 due to incomplete engagement of the male connector 710 with the female connector 720 when the user inserts the male connector 710 into the female connector 720.

In some embodiments, the connector assembly 400 and the plurality of switches SW1-SW4 of the connector assembly 700 are implemented by P-type or N-type transistors, for example, a P-type or N-type metal-oxide-semiconductor (NMOS for short) transistor.

Although the content of the disclosure has been disclosed above by using the implementations, the implementations are not used to limit the content of the disclosure. Any person skilled in the art makes various variations and modifications without departing from the spirit and scope of the content of the disclosure. Therefore, the protection scope of the content of the disclosure is defined by the appended claims.

What is claimed is:

1. A connector assembly, comprising:

a male connector, comprising N pins with different lengths, wherein the N pins respectively correspond to N different transmission signals; and a female connector, comprising N signal layers configured to transmit the N different transmission respectively, wherein each of the N signal layers comprises N pass gates, and one of the N pass gates of each of the N signal layers is configured to be coupled to a corresponding one of the N pins;

wherein distances between the N signal layers and the male connector are different from each other;

wherein when the male connector is engaged with the female connector, the N pins of the male connector are respectively in contact with the N pass gates on different signal layers, so that the N pins are respectively coupled to different signal layers by the N pass gates.

2. The connector assembly according to claim 1, wherein the female connector further comprises N top pins, and each of the N top pins comprises:

a top end, configured to be coupled to one of the N pins;

a connecting portion, comprising a conducting element, wherein the one of the N pins is configured to push the conducting element to a corresponding one of the N signal layers when the male connector is engaged with the female connector; and a reset element, coupled to the connecting portion, wherein when the male connector is coupled to the female connector, a length variance of the reset element is positively correlated with a length of the one of the N pins.

3. The connector assembly according to claim 2, wherein a size of the conducting element is greater than an aperture of each of the N pass gates on a first signal layer.

4. The connector assembly according to claim 1, wherein the N pass gates of each of the N signal layers each comprise a set of elastic pieces, wherein the set of elastic pieces are configured to be electrically coupled to the corresponding one of the N pins.

5. The connector assembly according to claim 1, wherein a first pin of the N pins is configured to enable a plurality of switches of the N signal layers to connect the N signal layers, and the first pin is a longest one of the N pins.

6. A female connector, configured to be coupled to a male connector, wherein the male connector has N pins with different lengths, the N pins respectively correspond to N different transmission signals, and the female connector comprises:

N signal layers, configured to transmit the N different transmission respectively, wherein each of the N signal layers comprises N pass gates, and one of the N pass gates of each of the N signal layers is configured to be coupled to a corresponding one of the N pins;

wherein distances between the N signal layers and the male connector are different from each other;

wherein when the male connector is engaged with the female connector, the N pins of the male connector are respectively in contact with the N pass gates on different signal layers, so that the N pins are respectively coupled to different signal layers by the N pass gates.

7. The female connector according to claim 6, further comprising N top pins, wherein each of the N top pins comprises:

a top end, configured to be coupled to one of the N pins;

a connecting portion, comprising a conducting element, wherein when the male connector is engaged with the female connector, the one of the N pins is configured to push the conducting element to a corresponding one of the N signal layers; and a reset element, coupled to the connecting portion, wherein when the male connector is coupled to the female connector, a length variance of the reset element is positively correlated with a length of the one of the N pins.

8. The female connector according to claim 7, wherein a size of the conducting element is greater than an aperture of each of the N pass gates on a first signal layer.

9. The female connector according to claim 6, wherein the N pass gates of each of the N signal layers each comprise a set of elastic pieces, and the set of elastic pieces are configured to be electrically coupled to the corresponding one of the N pins.

10. The female connector according to claim 6, wherein a first pin of the N pins is configured to enable a plurality of switches of the N signal layers to connect the N signal layers, and the first pin is a longest one of the N pins.

* * * * *